(12) United States Patent
Hsia et al.

(10) Patent No.: US 11,592,620 B1
(45) Date of Patent: Feb. 28, 2023

(54) OPTICAL FIBER COMBINER

(71) Applicant: Lightel Technologies, Inc., Renton, WA (US)

(72) Inventors: Chungho Hsia, Bellevue, WA (US); Pai-Sheng Shen, Bellevue, WA (US)

(73) Assignee: Lightel Technologies, Inc., Renton, WA (US)

( * ) Notice: Subject to any disclaimer, the term of this patent is extended or adjusted under 35 U.S.C. 154(b) by 0 days.

(21) Appl. No.: 17/576,890

(22) Filed: Jan. 14, 2022

(51) Int. Cl.
*G02B 6/28* (2006.01)

(52) U.S. Cl.
CPC ................... *G02B 6/2835* (2013.01)

(58) Field of Classification Search
CPC .................................................. G02B 6/2835
See application file for complete search history.

(56) References Cited

U.S. PATENT DOCUMENTS

| | | | | |
|---|---|---|---|---|
| 5,864,644 A * | 1/1999 | DiGiovanni | ......... | G02B 6/2856 385/48 |
| 5,999,673 A | 12/1999 | Valentin et al. | | |
| 6,434,302 B1 * | 8/2002 | Fidric | .................. | G02B 6/2856 385/48 |
| 7,272,956 B1 * | 9/2007 | Anikitchev | .......... | G02B 6/2835 65/408 |
| 7,720,340 B2 * | 5/2010 | Lewis | ................... | G02B 6/2804 385/98 |
| 7,991,255 B2 * | 8/2011 | Salokatve | ............ | G02B 6/2835 65/408 |
| 8,837,885 B2 * | 9/2014 | Seo | ..................... | G02B 6/29317 372/71 |
| 9,435,943 B1 * | 9/2016 | Takenaga | ........... | G02B 6/02019 |
| 2006/0133731 A1 | 6/2006 | Sintov | | |
| 2010/0183261 A1 | 7/2010 | Gonthier et al. | | |

* cited by examiner

*Primary Examiner* — Daniel Petkovsek
(74) *Attorney, Agent, or Firm* — Han IP PLLC; Andy M. Han (57) ABSTRACT

An optical fiber combiner comprises a double-clad fiber (DCF) and one or more multimode fibers (MMFs). DCF comprises a transition portion, a first taper portion, and an output section coupling to the first taper portion, whereas each of MMFs comprises a second taper configured to be fused around DCF in the transition portion. MMFs are configured to carry a combined optical energy (COE) and to couple to DCF. COE passes through the second taper with larger divergence of higher-order modes generated and coupled into DCF, whereas the first taper portion can partially offset the larger divergence. COE coupled, when traced through the output section, emerges in air with a smaller output beam divergence of the higher-order modes, thereby preserving some of the higher-order modes in the output section and increasing a coupling efficiency of COE coupled from MMFs to DCF with improved thermal performance.

5 Claims, 4 Drawing Sheets

OPTICAL FIBER COMBINER

TECHNICAL FIELD

The present disclosure relates to an optical fiber combiner used in high optical pump power applications and more particularly to a novel beam divergence reduction scheme adopted to preserve some of higher-order modes and to increase coupling efficiency of a combined optical energy coupled from one or more multimode fibers to a double-clad fiber with improved thermal performance and reliability.

BACKGROUND

High power fiber lasers have received a wide attention in the past ten years. Such lasers with several kilowatts (kWs) or several tens of kWs have been used as commercially available products in industries. In comparison with solid-state lasers, fiber lasers have a unique feature of a superb beam quality at high power due to an all-fiber configuration. That is, all the optical components used in the fiber lasers are of optical fiber type and are connected using fusion splices without air interfaces between any two of the optical components in connection. The optical components include multiple diode laser pumps with multiple optical fiber pigtails, a rare-earth-doped optical fiber with two fiber Bragg gratings, a transmission fiber spliced to the rare-earth-doped optical fiber, and an optical fiber combiner with multiple input optical fibers to splice to the multiple optical fiber pigtails of the multiple diode laser pumps and with an output optical fiber to splice to the rare-earth-doped optical fiber. The rare-earth-doped optical fiber, doped with a rare earth element such as erbium (Er) or ytterbium (Yb) as a gain medium, provides for a beneficial geometry and a large surface to volume ratio, thus allowing for extraordinary heat dispersion and reducing thermal lensing effect when compared to rod type solid state lasers. The rare-earth-doped optical fiber with the gain medium receives and absorbs optical energy from the multiple diode laser pumps through the optical fiber combiner and creates a coherent laser light via a resonator built by using the two fiber Bragg gratings at two ends of the rare-earth-doped optical fiber. Such multimode fiber lasers in the 2- to 6-kW regime are ideal for cutting and welding, and particularly in the area of materials processing and laser machining as a reliable replacement for bulky diode pumped solid-state lasers and $CO_2$ lasers. It has been shown that lengthening the rare-earth-doped optical fiber can inherently increase power of the fiber lasers without a limit. However, double clad optical fibers (DCFs) used in both the output optical fiber of the optical fiber combiner and the rare-earth-doped optical fiber are surrounded by polymer coatings with a limited tolerance to heat. In other words, the maximum thermal load provided by the coating dictates the maximum output power that the fiber laser can attain.

Not similar to optical fibers used in optical communications, where the coatings outside the optical fibers simply play a role of mechanical protection, the polymer coatings used in DCFs, however, perform both mechanical and optical functions. DCFs use dual acrylate coatings, with a first low refractive index polymer coating in contact with the glass, and with a durable second coating to protect the first relatively soft low refractive index coating. In other words, the second coating mechanically protects the low refractive index coating from mechanical chips, cuts, or scratches which may result in optical energy to leak out from the fiber, possibly creating localized hot spots or catastrophic burns at high pump powers. DCFs with the dual acrylate coating can pass the stringent reliability test specified by Telcodia GR-20 standard used in the telecom industry.

An N×1 tapered fiber bundle (TFB) is used to combine multiple ("N") inputs from multimode fiber pigtails connecting to multiple pump diodes into a single output. The "N" satisfies the brightness conservation theorem, and the maximum "N" is 6, 13, 17, 24, 53, 63, 136, etc., depending on various combinations of various diameter and numerical aperture (NA) of the input optical fibers and the output optical fiber. In practice, the N is chosen to be far smaller than the maximum numbers specified above to provide some margin. The N×1 tapered fiber bundle is typically fabricated in a process similar to fused fiber couplers by bundling in parallel N multimode optical fibers that have been stripped of their polymer coatings. The N multimode optical fibers are then fused and tapered by heating with a flame such as electric arc, oxyhydrogen flame, or a $CO_2$ laser beam. A fused and tapered section is then cleaved in the middle and spliced to a single output fiber. The use of N×1 tapered fiber bundle to combine multiple laser diode pumps into one fiber is essential for pumping the fiber lasers. For a 7×1 tapered fiber bundle, each of seven input optical fibers with 200-μm diameter and 0.22-NA receives, for example, 200 W from each diode laser pump. Seven such laser pumps are combined into a single 400-μm double-clad fiber with 0.46-NA. This configuration gives a pumping module composed of active and passive components, delivering 1.4 kWs power for a fiber laser, based on the commercially available 200-W laser diode pumps. For more examples, with a Yb-doped fiber of 400-μm and 0.46-NA, a common tapered fiber bundle coupling six 200 μm 0.22-NA pump delivery fibers each with a pump power of 500 W provides a total power greater than 3 kWs. Using a 19×1 tapered fiber bundle and greater than 100-W pump power delivered in each 105-μm input optical fiber, a total of about 2-kW pump power can be achieved.

The tapered fiber bundle can also be used in optical fiber amplifiers to combine pump and signal light that is confined to the core of a double-clad fiber. In this case, the fiber in the center of the tapered fiber bundle is replaced by the double-clad fiber with the core carrying an amplifier seed. This is commonly referred to as an (N+1)×1 combiner, which is critical for the optical fiber amplifiers. As an example, a (6+1)×1 combiner accommodating six pump fibers and the double-clad fiber as a signal fiber can be used for a 1 kW co-pumped optical fiber amplifier, based on six pump diodes each delivering, for example, 250 W of pump power for a total pump power of 1.5 kWs. No matter whether 7×1 or (6+1)×1, the optical fiber combiner needs to be thermally managed to maintain its reliability. Specifically, the residual pump power, amplified spontaneous emission (ASE) power, and unwanted signal power trapped in an outer cladding of the double-clad fiber in the fiber lasers or the optical fiber amplifiers need to be removed to avoid potential damages to components downstream. The residual pump power can be in hundreds of watts in kW fiber lasers and the ASE can be in the range of many watts, typically much higher in the optical fiber amplifiers. The unwanted energy launching into the outer cladding of the double-clad fiber creates localized hot spots or catastrophic burns at high pump powers. The most efficient way to remove the cladding light is to strip the low-index fluoroacrylic coating off a length of the fiber and re-coat it with a high-index coating so that high-NA cladding light can be stripped.

A conventional optical fiber combiner is based on an end-coupling technology and is basically an (N+1)×1 TFB pump combiner. The (N+1)×1 TFB pump combiner is a hexagonally packed fiber bundle fused and tapered for stability and high packing density. The resulting cross section of the hexagonally stacked bundle is close to a circle, and thus eases splicing with the output optical fiber. However, in making TFB, the signal fiber in a central position is tapered, twisted, and fused with "N" pump fibers. The signal fiber is significantly affected, resulting in an optical loss for a signal light and beam quality degradation for pump lights. A splicing loss may be high due to mode field diameter mismatch between the TFB and a rare-earth-doped double-clad fiber in applications of the optical fiber lasers and the optical fiber amplifiers.

With the emergence and development of double-clad fibers, large mode area fibers, semiconductor lasers as pumping sources, and cascade-pumping technologies, an output power of the fiber lasers continues to increase. The pumping sources and a resonant cavity with a gain medium are used through fiber fusion-splice processes. The all-fiber structure makes the system more compact and stable with a higher coupling efficiency and better reliability. A high coupling efficiency of an optical fiber signal-and-pump combiner is essential to build the fiber lasers with a high power level because a power carrying capability of such fiber lasers directly relates to the high coupling efficiency, which further determines an output power level of such fiber lasers. Such an optical fiber signal-and-pump combiner adopts a conventional side-coupling technology and uses a circumferential side of the double-clad fibers for one or more pump lights with a pump power to launch and couple into an inner cladding of the double-clad fibers without occupying two ends of the double-clad fibers, therefore, not affecting an input and an output of the signal light and its transmission. The main advantage of this technology is that the signal fiber in a central position is not tapered, which can greatly reduce the loss of the signal light, improve the coupling efficiency ensuring good performance, and maintain beam quality to potentially achieve a scheme of multipoint cascade-pumping. Also, not like TFB based on the end-coupling technology, the optical fiber signal-and-pump combiner based on the conventional side-coupling technology does not need cleaving in the middle of the TFB and splicing to another single output fiber. Furthermore, the double-clad fibers used in the optical fiber signal-and-pump combiner match most of rare-earth-doped double-clad fibers in NA and core and cladding diameters without mode field diameter mismatch. Such features cannot be achieved using an end-coupling technology of tapered fiber bundles mentioned above.

A side-coupling based optical fiber signal-and-pump combiner with high reliability and good stability is of great significance for constructing fiber laser systems with high power and high beam quality because it can support "N" laser pumps launching into the (N+1)×1 optical fiber signal-and-pump combiner with all the signal and the pump power outputted from the one signal fiber to achieve a high output power. In reported all-fiber structures, the side-coupling based optical fiber combiner is made by a fiber tapering and fusion method in which the tapered pumping fiber is directly fused with the inner cladding of the signal fiber, achieving higher pumping coupling efficiency and a power carrying capability of kilowatts of pumping power. Therefore, this technology has become a mainstream for making high-power side-coupling based optical fiber signal-and-pump combiners. However, the conventional side-coupling technology adopted to build such high-power optical fiber combiners do not meet requirements, in which either coupling efficiency is not as high as expected or the insertion loss is not low enough, resulting in a low production yield. It is, therefore, the purpose of this patent application to disclose a novel taper scheme that can be used in building such side-coupling based optical fiber signal-and-pump combiners (the optical fiber combiners, hereinafter) to effectively reduce a beam divergence of the pump light outputted from the optical fiber combiners and a heat accumulation in so called localized hot spots in the polymer coatings of the signal fiber while maintaining beam quality of output signal and the pump lights.

SUMMARY

An optical fiber pump combiner comprises a length of double-clad fiber and one or more multimode fibers. The length of double-clad fiber comprises a first core, a first cladding with a first diameter, a second cladding, and an outer polymer coating over the second cladding. The length of double-clad fiber is configured to transmit an optical signal in the first core and bounded in a first interface between the first core and the first cladding, whereas the optical signal propagates in a forward direction from an input to an output of the length of double-clad fiber. The length of double-clad fiber further comprises a cladding-stripped portion with the second cladding stripped, whereas the cladding-stripped portion comprises a first portion in close proximity to the input, a first taper portion, and a transition portion connecting between the first portion and the first taper portion. The first taper portion comprises cross sections with their diameters progressively reduced from the first diameter to a predetermined diameter in a backward direction.

Each of the one or more multimode fibers comprises a second core, a third cladding, outer claddings and buffer coatings over the third cladding, and a section of multimode fiber with the outer claddings and buffer coatings stripped. A part of the section of multimode fiber is configured to be heated and stretched into a second taper portion with a first predetermined taper slope with respect to an optical axis of each of the one or more multimode fibers. One or more second taper portions in the one or more multimode fibers are configured to be fused around the transition portion, whereas the one or more multimode fibers are configured to carry a combined optical energy and to couple thereof to the length of double-clad fiber, continuing to be guided in the first cladding and bounded in a second interface between the first cladding and the air in the first taper portion. The combined optical energy may come from the multiple diode laser pumps with multiple optical fiber pigtails.

The combined optical energy is coupled into the one or more multimode fibers each at an incident angle against the optical axis of an associated multimode fiber less than a first maximum acceptance angle determined by a first numerical aperture (NA) of each of the one or more multimode fibers. The combined optical energy incident slightly less than the first maximum acceptance angle is reflected in the second taper portion with a divergence angle against the optical axis of the associated multimode fiber larger than the incident angle with higher-order modes generated. The higher-order modes lead to larger divergence. On the other hand, the first taper portion in the length of double-clad fiber is configured to reduce the larger divergence of the higher-order modes, thereby preserving some of the higher-order modes bounded in the length of double-clad fiber and increasing a coupling efficiency of the combined optical energy coupled from the one or more multimode fibers to the length of double-clad fiber.

The length of double-clad fiber further comprises a third portion comprising an intermediate section with the second cladding stripped and an output section, whereas the third portion is configured to connect the intermediate section to the first taper portion and to output both the optical signal and the combined optical energy coupled. It is the third portion that a rare-earth-doped double-clad fiber can be spliced with in applications of optical fiber lasers and optical fiber amplifiers for mode field diameter matches. The combined optical energy coupled is guided in the first cladding and bounded by a third interface between the first cladding and the second cladding in the output section. The first taper portion comprises a second predetermined taper slope configured to partially offset the larger divergence of the higher-order modes in the second taper portion and to minimize numbers of the higher-order modes to launch in the third portion and to leak from the third interface, thus reducing an energy loss and a number of localized hot spots, and further increasing power carrying capability and reliability of the optical fiber pump combiner. The transition portion comprises a power transfer region configured for the combined optical energy to transfer power from the one or more multimode fibers to the length of double-clad fiber. The first taper portion progressively reduces its diameter toward the predetermined diameter to form a waist in proximity to the power transfer region, whereas the second taper portion progressively reduces its diameter toward one end to form a second taper end. Ultimately, the waist and overall one or more second taper ends in the one or more multimode fibers are fused together to form a waist portion in the power transfer region with a cross-sectional diameter smaller than the first diameter.

The cladding-stripped portion is installed in a central position surrounded by the one or more second taper portions before the one or more second taper portions are further heated, stretched, and rotated all together in multiple processes. Each of multiple processes comprises a heated temperature range, heated positions, fiber pulling tensions of the one or more second taper portions, a rotation angle increment, and correction measures if the fiber pulling tensions do not reach predetermined ones. The one or more second taper portions are interlaced with each other and wrapped around the transition portion with an inclined angle subtended between an optical axis of the length of double-clad fiber and the optical axis of each of the one or more multimode fibers after the multiple processes are carried out. The third portion of the length of double-clad fiber is exerted with little stress during the multiple processes, thereby preserving an acceptable degradation and an acceptable insertion loss of the optical signal and beam quality of the combined optical energy coupled into the length of double-clad fiber.

The multiple processes further comprise a torch scanning process configured to control the fiber pulling tensions at the heated positions in the transition portion and to regulate the rotation angle increment. The one or more second taper portions interlaced are further heated, stretched, and finally fused and embedded in the transition portion, thereby enhancing the coupling efficiency of the combined optical energy, introducing little strain to the length of double-clad fiber, and further preserving the acceptable insertion loss of the optical signal and beam quality of the combined optical energy coupled into the length of double-clad fiber. The one or more second taper portions fused and embedded in the transition portion are further heated to remove an unwanted output part of each of the one or more second taper portions. The one or more second taper portions with the unwanted output part removed are further heated to liquefy material in each break region caused when the unwanted output part of each of the one or more second taper portions is removed. Each break region becomes a rounded surface converged toward the length of double-clad fiber, thereby further improving the coupling efficiency of the combined optical energy coupled from the one or more multimode fibers into the length of double-clad fiber.

The multiple processes further comprise a first heat treatment process configured to heat and stretch the transition portion to form the first taper portion. The multiple processes further comprise a second heat treatment process configured to heat and stretch the one or more second taper portions that are accordingly fused and embedded to an embedded depth, further reducing the larger divergence of the higher-order modes introduced in the one or more second taper portions and thereby further improving the coupling efficiency of the combined optical energy coupled from the one or more multimode fibers into the length of double-clad fiber. The multiple processes further comprise a third heat treatment process with a double-clad fiber pulling, whereas the double-clad fiber pulling in the transition portion is configured to lessen a micro-deformation in the first core caused in the multiple processes before the third heat treatment process, thereby further preserving an acceptable degradation, an acceptable insertion loss, and beam quality of the optical signal at the output of the length of double-clad fiber. The multiple processes further comprise a fourth heat treatment process configured to control the embedded depth in the transition portion and to modify launching conditions of the combined optical energy coupled to the length of double-clad fiber, thereby further reducing the larger divergence of the higher-order modes and improving coupling efficiency of the combined optical energy coupled from the one or more multimode fibers to the length of double-clad fiber. The multiple processes further comprise optical monitoring processes configured to observe and check the optical signal and the combined optical energy at the output of the length of double-clad fiber. Note that the micro-deformation is a microscopic fiber deformation commonly caused by a micro-bending due to a poor fiber cable design or external perturbations on an optical fiber, such as in a fiber fusion tapering process. In this case, light rays which would propagate in the optical fiber are lost in its cladding.

In contrast to all the reported side-coupling structures, the first taper portion is adopted with associated multiple processes in making the optical fiber combiner. Experimental results show that a (6+1)×1 optical fiber combiner based on the structure of the optical fiber combiner according to the present disclosure can achieve an output beam divergence improvement of 10%, a coupling efficiency of 98%, and a good beam quality for the combined optical energy with a high production yield while maintaining an insertion loss of 0.1 dB for the optical signal. Due to such output beam divergence improvement, a thermal performance is improved by at least 60%, thus enhancing reliability and power carrying capability of the (6+1)×1 optical fiber combiner.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Reference will now be made in detail to the preferred embodiments of the disclosure. Wherever possible, same or similar reference numerals are used in the drawings and the description to refer to the same or like parts or steps. The drawings are in their simplest form and are not to scale.

Figure 1:
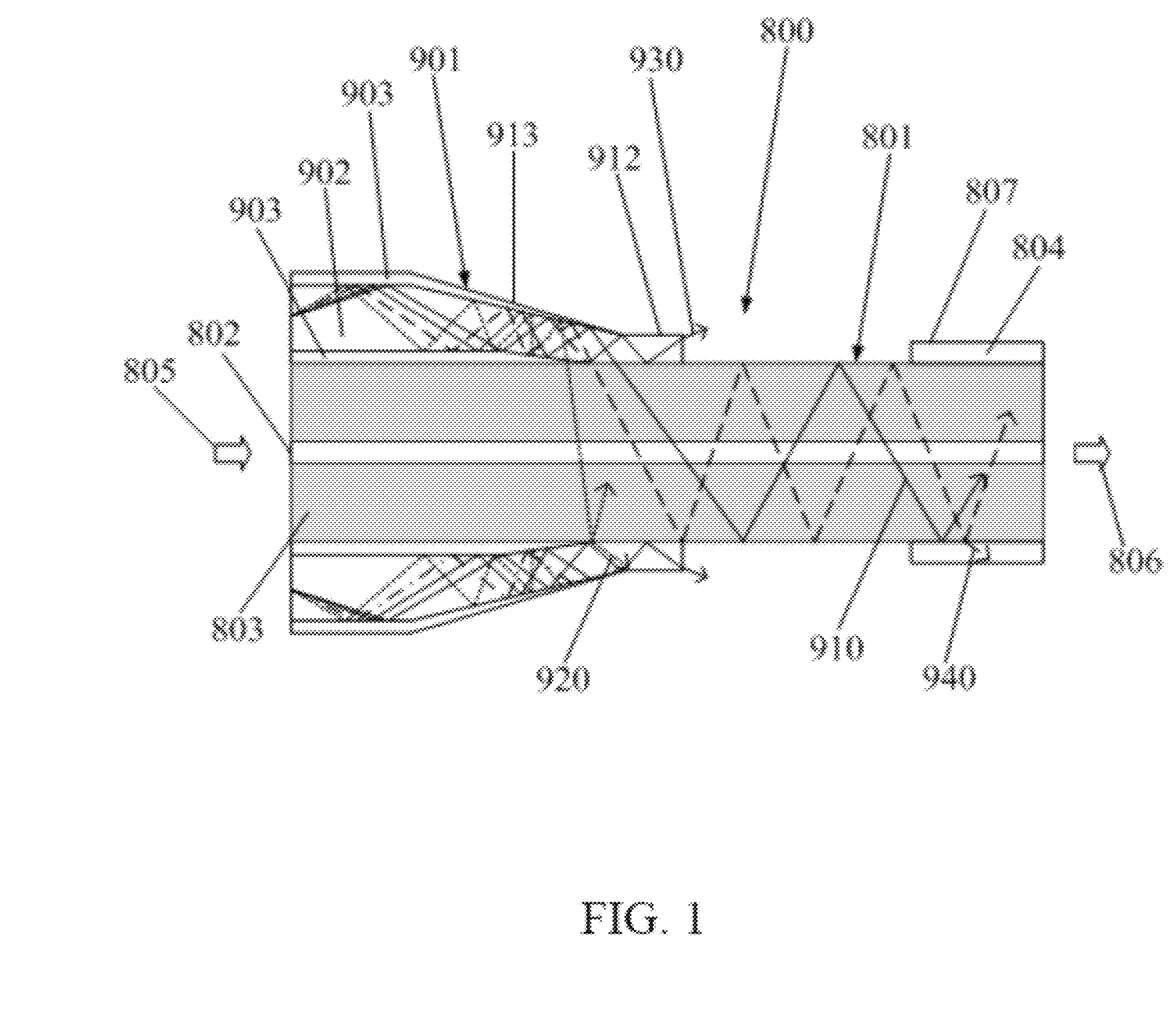
FIG. 1 is a power loss mechanism in a conventional optical fiber combiner.

FIG. 1 is a power loss mechanism in a conventional optical fiber combiner. In FIG. 1, a conventional (2+1)×1 optical fiber combiner 800 is used as an example. The conventional (2+1)×1 optical fiber combiner 800 comprises a signal fiber 801 and two tapered fibers 901 attached symmetrically around the signal fiber 801. For simplicity, only one of the two tapered fibers 901, say, an upper tapered fiber 901 (i.e. the tapered fiber 901, hereinafter) will be depicted here. The signal fiber 801 comprises a core 802, a first cladding 803, a second cladding 804, and a polymer coating 807. The signal fiber 801 is configured to transmit an optical signal in the core 802. The optical signal is bounded in a first interface between the core 802 and the first cladding 803. The optical signal propagates in a forward direction from an input 805 to an output 806 of the signal fiber 801. The tapered fiber 901 comprises a tapered waist portion 912 and a transition region 913. The tapered fiber 901 comprises a core 902 and a cladding 903 and is separated from the core 802 of the signal fiber 801 by the first cladding 803. No matter whether a pump light from the tapered fiber 901 is coupled into the signal fiber 801 from a side of the signal fiber 801, the optical signal can effectively be bounded in the core 802 with a high signal transmission. To achieve a high coupling efficiency of the pump light from the tapered fiber 901 to the signal fiber 801, a taper such as in the tapered waist portion 912 and the transition region 913 is needed, as one of the most important portion in the side-coupling technology, for the pump light to launch into the signal fiber 801. However, when the pump light passes through the taper, a beam divergence becomes larger and larger until total reflection conditions are not met. Those not exceeding the fiber critical angle against a surface normal become cladding modes. The tapered fiber 901 is attached to the first cladding 803 of the signal fiber 801. A refractive index of the first cladding 803 of the signal fiber 801 is larger than that of the core 902 of the tapered fiber 901, so the cladding modes are coupled into the signal fiber 801 and guided in the first cladding 803 of the signal fiber 801, all the way to complete a pump transfer process. In this case, the cladding 903 of the tapered fiber 901 is needed in the taper. That is, a coreless fiber cannot be used in the tapered waist portion 912 and the transition region 913. Because of the larger divergence of the higher-order modes in the taper, the pump light may leak out to the air, resulting in a decrease of coupling efficiency.

However, not all the pumping light can be effectively coupled into the signal fiber 801. The pumping light energy that is not coupled into the first cladding 803 of the signal fiber 801 all the way to the output 806 of the signal fiber 801 comprises a first power loss in the transition portion 913, a second power loss in the tapered waist portion 912, and a third power loss in the polymer coating 807 of the signal fiber 801. For the first power loss, a pump light with a larger incident angle in the taper experiences a large divergence increase in the taper. Even if the pump light exceeds the critical angle of the tapered fiber 901 and enters the signal fiber 801, a first pump light 920 cannot be guided in the first cladding 803 of the signal fiber 801 and then leaks into the air. Fortunately, a heat generated in the first power loss can be dissipated by a first heat sink that includes a thermal dispersion adhesive (not shown). For the second power loss, the pump light never reaches the critical angle of the tapered fiber 901. A second pump light 930 eventually transfers to an end of the tapered waist portion 912 being dissipated in the air. This occurs when an incident angle of the pump light is small or a taper ratio of the tapered fiber 901 is relatively small. The heat generated in the second power loss can also be dissipated by a second heat sink (not shown). For the third power loss, the pump light is coupled into the second cladding 804 further leaking to the polymer coating 807 of the signal fiber 801. Because the larger divergence of the higher-order modes exceeds the maximum acceptance angle determined by the numerical aperture of the signal fiber 801, a third pump light 940 leaks from the first cladding 803 of the signal fiber 801 into the polymer coating 807 over the second cladding 804 and is converted into a heat to accumulate on the conventional optical fiber combiner 800. The heat generated in the third power loss creates localized hot spots and causes irreversible burning damages to the conventional optical fiber combiner 800 and must be reduced by all means. The heat also limits the conventional optical fiber combiner 800 to withstand a high power. As shown in FIG. 1, only coupled and transmitted in the signal fiber 801 without a power loss is a fourth pump light 910 satisfying the maximum acceptance angle and supporting total internal reflections.

Figure 2:
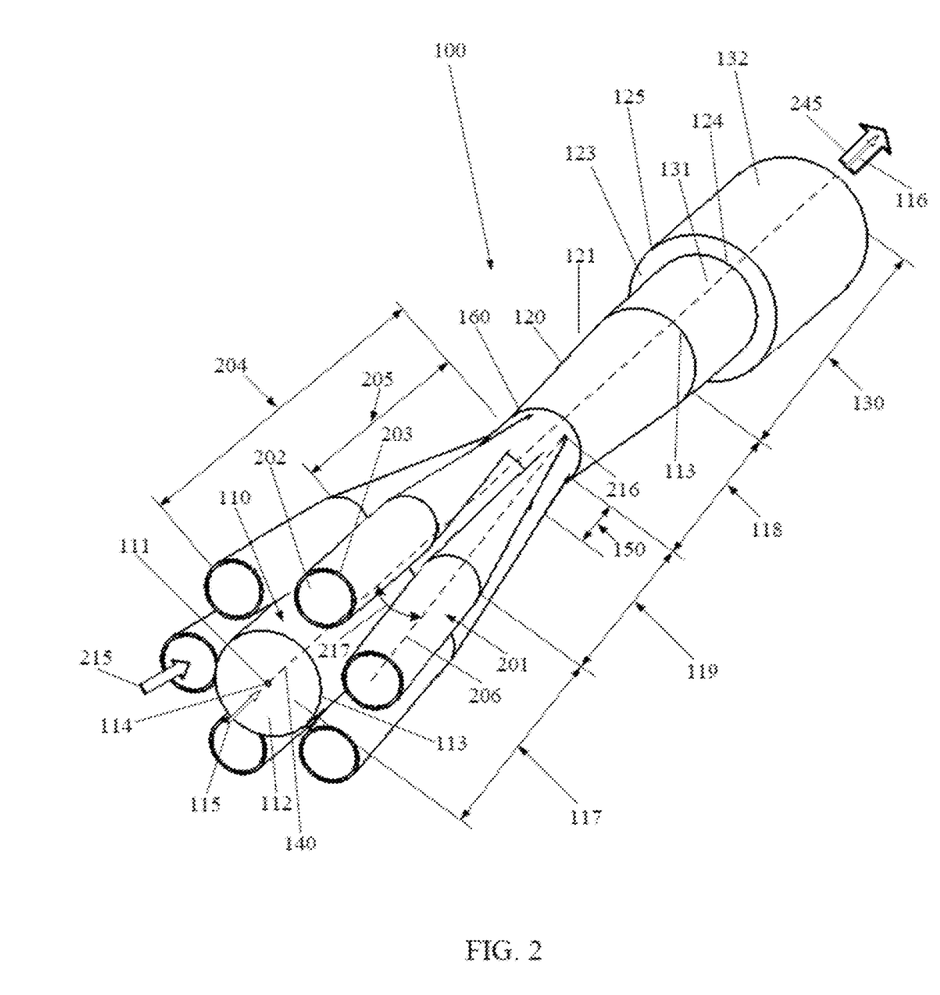
FIG. 2 is a perspective view of an optical fiber combiner according to the present disclosure.
Figure 3:
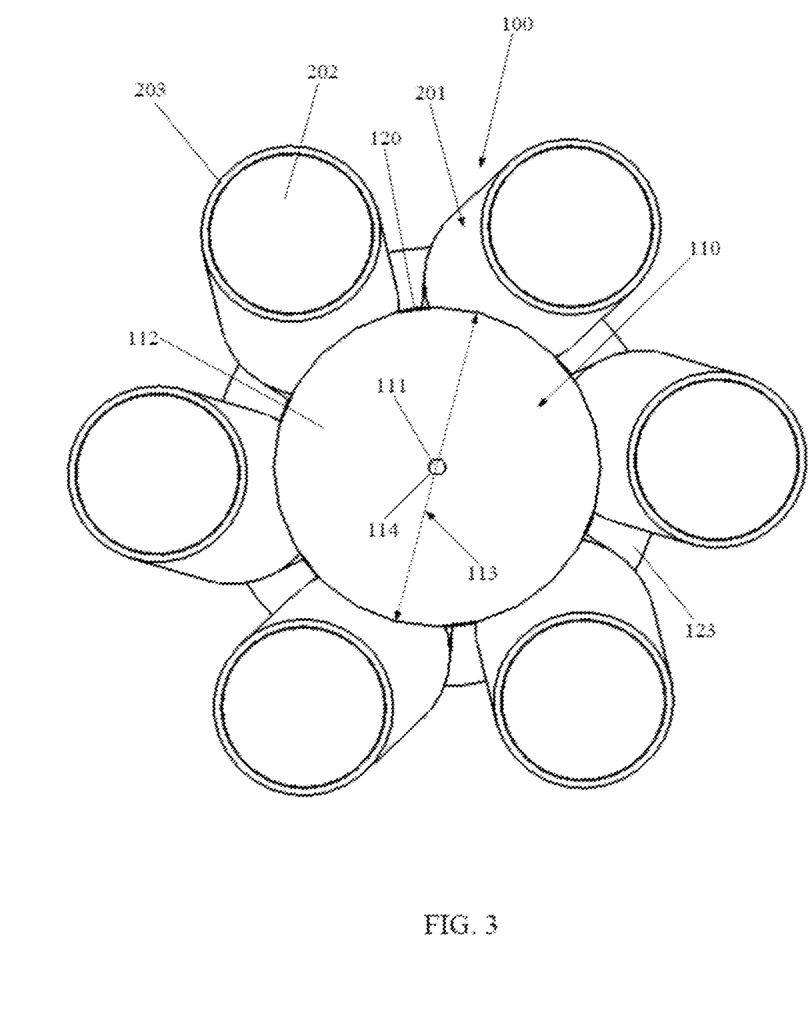
FIG. 3 is a front view of an optical fiber combiner according to the present disclosure.

FIG. 2 is a perspective view of an optical fiber combiner according to the present disclosure. FIG. 3 is a front view of an optical fiber combiner according to the present disclosure. Referring to FIG. 2 and FIG. 3, an optical fiber combiner 100 comprises a length of double-clad fiber 110 and one or more multimode fibers 201 comprising six multimode fibers. So, the optical fiber combiner 100 is a (6+1)×1 signal-and-pump combiner (the one or more multimode fibers 201, hereinafter). The length of double-clad fiber 110 comprises a first core 111, a first cladding 112 with a first diameter 113, a second cladding 123, and an outer polymer coating 125 over the second cladding 123, and configured to transmit an optical signal in the first core 111 and bounded in a first interface 114 between the first core 111 and the first cladding 112. The optical signal propagates in a forward direction from an input 115 to an output 116 of the length of double-clad fiber 110. The length of double-clad fiber 110 further comprises a cladding-stripped portion with both the second cladding 123 and the outer polymer coating 125 stripped. The cladding-stripped portion comprises a first portion 117 in proximity to the input 115, a first taper portion 118, and a transition portion 119 coupling between the first portion 117 and the first taper portion 118. The first taper portion 118 comprises cross sections with their diameters progressively reduced from the first diameter 113 to a first small taper end in a backward direction. The transition portion 119 comprises a power transfer region 150.

Referring to FIG. 2 and FIG. 3, the one or more multimode fibers 201, each comprising a second core 202, a third cladding 203, outer claddings and buffer coatings (not shown) over the third cladding 203, and a section of multimode fiber 204 with the outer claddings and buffer coatings stripped. A part of the section of multimode fiber 204 is configured to be heated and stretched into a second taper in a second taper portion 205 with a first predetermined taper slope with respect to an optical axis 206, for example, of each of the one or more multimode fibers 201. The second taper in the second taper portion 205 is configured to be fused around the transition portion 119 with a second small taper end in the power transfer region 150. The one or more multimode fibers 201 are configured to carry a combined optical energy and to couple thereof to the length of double-clad fiber 110, continuing to be guided in the first cladding 112 and bounded in a second interface 120 between the first cladding 112 and the air 121 in the first taper portion 118. The combined optical energy may come from the multiple diode laser pumps with multiple optical fiber pigtails. In FIG. 2, the combined optical energy is inputted from a pump input 215, for example. The first predetermined taper slope has a negative sign in a forward direction from the pump input 215 to the second small taper end of the second taper portion 205, meaning that the second taper portion 205 has cross sections with their diameters progressively reduced in the forward direction from a diameter of the third cladding 203 to the second small taper end. The combined optical energy is transferred from the one or more multimode fibers 201 to the length of double-clad fiber 110 via the power transfer region 150.

In FIG. 2, the length of double-clad fiber 110 further comprises a third portion 130 comprising an intermediate section 131 with both the second cladding 123 and the outer polymer coating 125 stripped and an output section 132 in proximity to the output 116. The third portion 130 is configured to connect the intermediate section 131 to the first taper portion 118 and to output both the optical signal and the combined optical energy coupled. The intermediate section 131 may be omitted. In that case, the third portion 130 is configured to couple the output section 132 to the first taper portion 118 and to output both the optical signal and the combined optical energy coupled. The combined optical energy coupled is guided in the first cladding 112 and bounded by a third interface 124 between the first cladding 112 and the second cladding 123 in the output section 132 if the larger divergence of the higher-order modes of the combined optical energy coupled in the output section 132 is less than the second maximum acceptance angle determined by a second numerical aperture further dictated by refractive indices of the first cladding 112 and the second cladding 123. The output 116 of the length of double-clad fiber 110, which is an output of the optical signal, is an output 245 of the combined optical energy coupled.

Referring to FIG. 2 and FIG. 3, the combined optical energy is coupled into the one or more multimode fibers 201 each at an incident angle against the optical axis 206 of an associated multimode fiber less than the first maximum acceptance angle determined by the first numerical aperture (NA) of each of the one or more multimode fibers 201. The combined optical energy incident slightly less than the first maximum acceptance angle is reflected in the second taper portion 205 with a divergence angle against the optical axis 206 of the associated multimode fiber larger than the incident angle with higher-order modes generated. The higher-order modes lead to larger divergence. Without properly being taken care of, the larger divergence could result in the third power loss depicted in FIG. 1, creating localized hot spots in the output section 132 and causing burning damages. On the other hand, the first taper portion 118 in the length of double-clad fiber 110 is configured to reduce the larger divergence of the higher-order modes, thereby preserving some of the higher-order modes bounded in the second interface 120 to be continuously bounded in the third interface 124 and increasing a coupling efficiency of the combined optical energy coupled from the one or more multimode fibers 201 to the length of double-clad fiber 110.

Referring to FIG. 2 and FIG. 3, the first taper portion 118 comprises a second predetermined taper slope configured to partially offset the larger divergence of the higher-order modes in the second taper portion 205 and to minimize a number of the higher-order modes to launch in the third portion 130 and to leak from the third interface 124, resulting in an energy loss, creating localized hot spots, causing failures, and reducing power carrying capability of the optical fiber pump combiner 100. The second predetermined taper slope has an opposite sign to the first predetermined taper slope (i.e., a positive sign) in a forward direction from the signal input 115 to an end of the first taper portion 118, meaning that the first taper portion 118 comprises cross sections with their diameters progressively reduced from the first diameter 113 to a predetermined diameter in a backward direction, as mentioned. The power transfer region 150 is configured for the combined optical energy to transfer power from the one or more multimode fibers 201 to the length of double-clad fiber 110. The first taper portion 118 progressively reduces its diameter toward the predetermined diameter to form a waist in proximity to the power transfer region 150, whereas the second taper portions 205 progressively reduces its diameter toward one end to form a second taper end. Ultimately, the waist and overall one or more second taper ends in the one or more multimode fibers are fused together to form a waist portion 160 in the power transfer region 150 with a cross-sectional diameter smaller than the first diameter.

The cladding-stripped portion is installed in a central position before the one or more second taper portions 205 surrounded are further heated, stretched, and rotated all together in multiple processes. Each process comprises a heated temperature range, heated positions, fiber pulling tensions of each of the one or more second taper portions 205, a rotation angle increment, and correction measures if the fiber pulling tensions do not reach predetermined ones. The one or more second taper portions 205 are interlaced with each other and wrapped around the transition portion 119 with an inclined angle 217 subtended between an optical axis 140 of the length of double-clad fiber 110 and the optical axis 206 of the one or more multimode fibers 201 after the multiple processes are carried out, whereas the third portion 130 of the length of double-clad fiber 110 is exerted with little stress during the multiple processes, thereby preserving an acceptable degradation and an acceptable insertion loss of the optical signal and beam quality of the combined optical energy coupled into the length of double-clad fiber 110. Heating and rotating the one or more second taper portions 205 around the length of double-clad fiber 110 in the multiple processes makes the one or more second taper portions 205 to approach and eventually touch a circumferential side of the length of double-clad fiber 110 whereas the third portion 130 is not rotated and exerted with little stress during the multiple processes, thereby preserving an acceptable degradation and an acceptable insertion loss of the optical signal and beam quality of the combined optical energy coupled in the length of double-clad fiber 110. The multiple processes further comprise a torch scanning process configured to control the fiber pulling tensions of each of the one or more multimode fibers 201 at the heated positions in the transition portion 119 and to regulate the rotation angle increment.

Referring to FIG. 2 and FIG. 3, the one or more second taper portions 205 interlaced are further heated, stretched, and finally fused and becoming embedded in the transition portion 119, thereby enhancing the coupling efficiency of the combined optical energy, introducing little strain to the length of double-clad fiber 110, and further preserving the acceptable insertion loss of the optical signal and beam quality of the combined optical energy coupled in the length of double-clad fiber 110. The one or more second taper portions 205 fused and embedded in the length of double-clad fiber 110 are further heated to remove an unwanted output part of each of the one or more second taper portions 205. The one or more second taper portions 205 with the unwanted output part removed are further heated to liquefy material in each break region 216 caused when the unwanted output part of each of the one or more second taper portions 205 is removed. Each break region 216 becomes a rounded surface converged toward the length of double-clad fiber 110, thereby further improving the coupling efficiency of the combined optical energy coupled from the one or more multimode fibers 201 to the length of double-clad fiber 110.

In view of above, a method of producing the optical fiber combiner 100 may comprise: (a) installing the one or more multimode fibers 201 stripped of outer claddings and buffer coatings in a jig; (b) heating and stretching the one or more multimode fibers 201 stripped of outer claddings and buffer coatings to form one or more second taper portions 205, each of the one or more second taper portions 205 comprising a first predetermined taper slope with respect to an optical axis of each of the one or more multimode fibers 201; (c) inserting a length of double-clad fiber 110 stripped of an outer polymer coating in a central position of the jig without touching the one or more second taper portions 205; and (d) heating and rotating the one or more second taper portions 205 so that each of a small taper end of the one or more second taper portions 205 is fused and embedded around a circumferential side of the length of double-clad fiber 110 stripped of the outer polymer coating. The multiple processes further comprise a first heat treatment process configured to heat and stretch the first taper portion 118 to form a first taper in the first taper portion 118. The multiple processes further comprise a second heat treatment process configured to heat and stretch the one or more second taper portions 205 that are accordingly fused and embedded to an embedded depth in the transition portion 119, further reducing the larger divergence of the higher-order modes generated in the one or more second taper portions 205 and thereby further improving the coupling efficiency of the combined optical energy coupled from the one or more multimode fibers 201 into the length of double-clad fiber 110. Note that when the one or more second taper portions 205 are embedded to the embedded depth in the transition portion 119, an output beam divergence from the length of double-clad fiber 110 is further reduced, thus increasing coupling efficiency of the combined optical energy coupled from the one or more multimode fibers 201 to the length of double-clad fiber 110. In other words, the embedded depth in the transition portion 119 has an effect to reduce the larger divergence of the higher-order modes generated in the one or more second taper portions 205 and to increase coupling efficiency of the combined optical energy coupled from the one or more multimode fibers 201 to the length of double-clad fiber 110.

The multiple processes may further comprise a third heat treatment process with a double-clad fiber pulling. The double-clad fiber pulling in the transition portion 119 is configured to lessen a micro-deformation in the first core 111 caused in the multiple processes before the third heat treatment process, thereby further preserving acceptable degradation, an acceptable insertion loss, and beam quality of the optical signal at the output 116 of the length of double-clad fiber 110. The multiple processes further comprise a fourth heat treatment process configured to control the embedded depth in the transition portion 119 and to modify launching conditions of the combined optical energy coupled to the length of double-clad fiber 110, thereby further reducing the larger divergence of the higher-order modes and improving coupling efficiency of the combined optical energy coupled from the one or more multimode fibers 201 to the length of double-clad fiber 110. The multiple processes may further comprise optical monitoring processes configured to observe and check the optical signal and the combined optical energy at the output 116 of the length of double-clad fiber 110.

The optical fiber combiner 100 may further comprise a rare-earth-doped double-clad fiber spliced to the output 116 of the length of double-clad fiber 110 and configured to function as a part of an optical fiber laser to reduce excess optical losses of both the optical signal and the combined optical energy due to mode field diameter mismatch between the optical fiber combiner 100 and the rare-earth-doped double-clad fiber. The optical fiber combiner 100 may further comprise the rare-earth-doped double-clad fiber spliced to the output 116 of the length of double-clad fiber 110 and configured to function as a part of an optical fiber amplifier to reduce an excess optical losses of both the optical signal and the combined optical energy due to the mode field diameter mismatch between the optical fiber combiner 100 and the rare-earth-doped double-clad fiber. The optical fiber combiner 100 may further comprise one or more laser diode pigtails spliced to connect to each pump input 215 of the one or more multimode fibers 201 and configured to launch a part of the combined optical energy to the one or more multimode fibers 201 in applications of optical fiber lasers. The optical fiber combiner 100 may further comprise one or more fiber lasers connected to each pump input 215 of the one or more multimode fibers 201 and configured to launch a part of the combined optical energy to the one or more multimode fibers 201 in applications of optical fiber lasers. The one or more multimode fibers 201 may comprise six or more multimode fibers.

Figure 4:
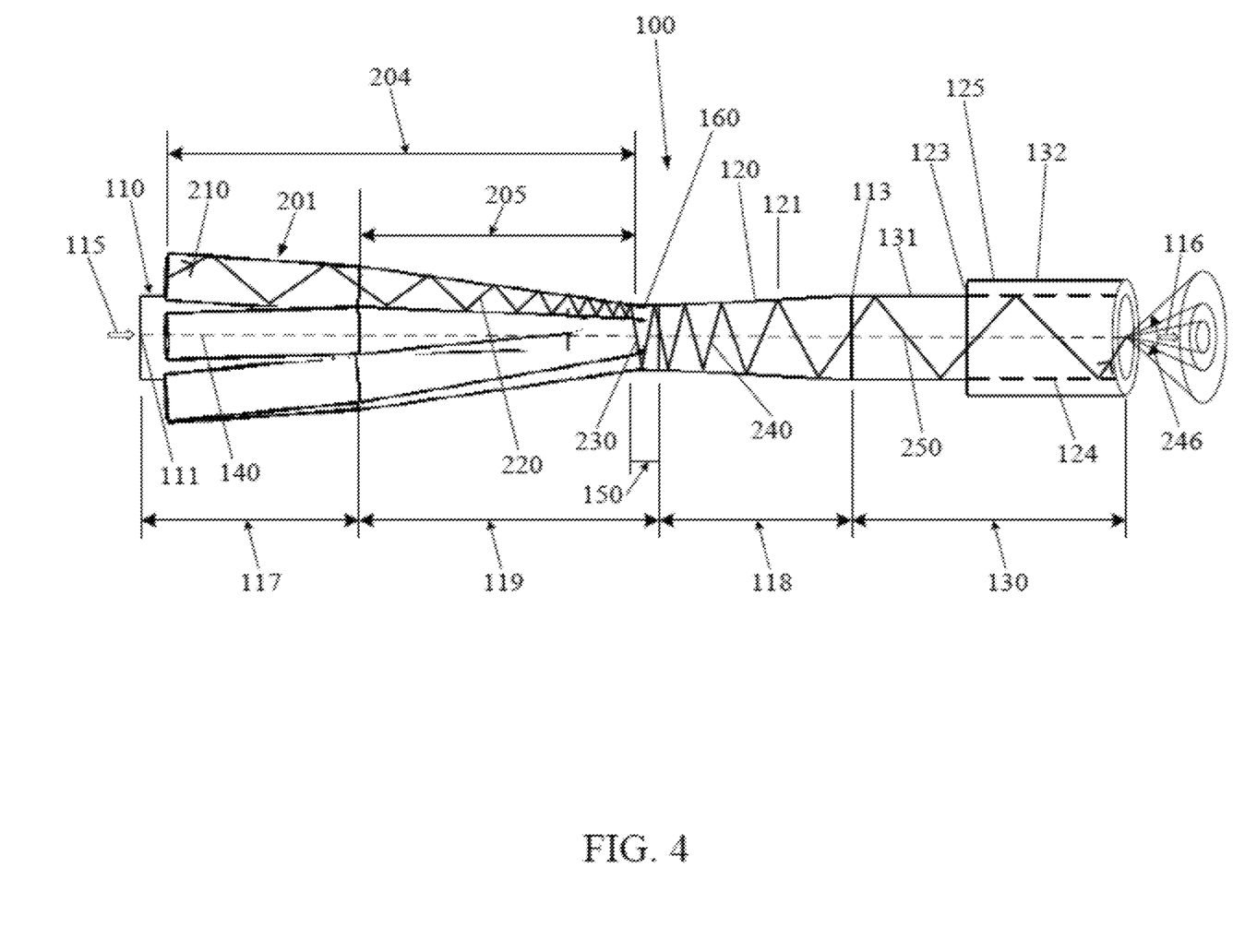
FIG. 4 is an example of a pump light launched and reflected in an optical fiber combiner according to the present disclosure.

FIG. 4 is an example of a pump light launched and reflected in an optical fiber combiner according to the present disclosure. In FIG. 4, a right view of the optical fiber combiner 100 is depicted with a sketch of the pump light launched and reflected in the optical fiber combiner 100. Note that the third cladding 203 of each of the one or more multimode fibers 201 is present although not visible in FIG. 4. Referring to FIG. 2 and FIG. 4, each of the one or more second taper portions 205 is fused around the transition portion 119 at the inclined angle 217. Shown here is an example of a meridional ray which passes through the optical axis 206 (in FIG. 2) of the one or more multimode fibers 201 and obeys a self-interference condition. In other words, the meridional ray intersects the optical axis 206 at each internal reflection. In FIG. 4, a light ray 210 is incident slightly less than the first maximum acceptance angle determined by the first numerical aperture (NA) of each of the one or more multimode fibers 201. When the light ray 210 passes through the one or more second taper portions 205, the higher-order modes are generated because a divergence angle against the optical axis 206 increases for each internal reflection. In other words, the higher-order modes lead to larger divergence. The higher-order modes with a first light ray 220 launch into the transition portion 119. The divergence angle of the first light ray 220 becomes larger and larger in the one or more second taper portions 205 after more internal reflections. Note that a pump power transferred in a power transfer process involves an initial adiabatic transfer of the power in the second core 202 to an interface between the third cladding 203 and the air 121. The pump power is then transferred to adjacent cladding modes bounded by the second interface 120 between the first cladding 112 and the air 121 in the first taper portion 118 and the intermediate section 131 (see also FIG. 2) and finally bounded by the third interface 124 between the first cladding 112 and the second cladding 123 in the output section 132. The one or more multimode fibers 201 according to the present disclosure comprise a 0.22-NA. The one or more second taper portions 205 are configured to increase beam divergence of the higher-order modes so that the pump power can be transferred to adjacent cladding modes bounded by the second interface 120 between the first cladding 112 and the air 121. Without the first taper portion 118, the larger divergence of the higher-order modes will be maintained throughout the third portion 130 according to a principle of total internal reflection in an optical fiber. The length of double-clad fiber 110 according to the present disclosure comprises a 0.46-NA. For those higher-order modes not guided by the 0.46-NA, the combined optical energy will leak out from the third interface 124 between the first cladding 112 and the second cladding 123 into the outer polymer coating 125, converting into a heat to accumulate in the output section 132, resulting in premature failures or burning damages.

In FIG. 4, when the larger divergence of the higher-order modes exceeds the first maximum acceptance angle determined by the first numerical aperture (NA) of each of the one or more multimode fibers 201, the first light ray 220 becomes a second light ray 230 ending up with a first cladding mode of the one or more multimode fibers 201. The one or more second taper portions 205 are fused to the first cladding 112 of the length of double-clad fiber 110. Because a refractive index of the first cladding 112 is larger than that of the second core 202 of the one or more multimode fibers 201, the first cladding mode is coupled into the length of double-clad fiber 110 in the power transfer region 150 and further bounded by the second interface 120, all the way to complete the power transfer process in the transition portion 119. For those light rays with the larger divergence of the higher-order modes not satisfying the second maximum acceptance angle determined by the second numerical aperture (NA) of the length of double-clad fiber 110, the combined optical energy coupled leaks to the air 121. For a third light ray 240 with the larger divergence of the higher-order modes satisfying the second maximum acceptance angle of the length of double-clad fiber 110 in the first taper portion 118, the combined optical energy coupled is guided in the second interface 120 in the first taper portion 118. The first taper portion 118 is therefore configured to decrease the larger divergence of the higher-order modes such as the third light ray 240. As shown, the larger divergence of the higher-order modes becomes smaller and smaller in the first taper portion 118, ending up with a fourth light ray 250 at an end of the first taper portion 118 continuing in the intermediate section 131. The fourth light ray 250 with a smaller divergence travels all the way to the output 116 of the length of double-clad fiber 110. As mentioned, the output 116 of the length of double-clad fiber 110, which is the output of the optical signal, is also the output 245 of the pump light coupled. As shown, the pump light coupled is outputted with a beam divergence 246. A half-angle of the beam divergence 246 is less than a divergence angle of the second light ray 230 if the first taper portion 118 is not present. As depicted in FIG. 1, not all light rays can be effectively coupled into the length of double-clad fiber 110 and transmitted thereof, especially when the first taper portion 118 is not in place. In that case, the second light ray 230 is directly coupled into the third portion 130 with the larger divergence of the higher-order modes, which may exceed the maximum acceptance angle determined by the second numerical aperture of the length of double-clad fiber 110, further dictated by refractive indices of the first cladding 112 and the second cladding 123 of the length of double-clad fiber 110. Parts of the second light ray 230 that exceeds the second maximum acceptance angle will leak from the second cladding 123 into the outer polymer coating 125 and is converted into a heat to accumulate in the output section 132. The heat will cause a dramatic temperature rise on the outer polymer coating 125 and finally cause irreversible burning damages if the combined optical energy coupled is high enough. The heat will also limit the optical fiber combiner 100 to withstand a high power. The first taper portion 118 comprises the second predetermined taper slope configured to partially offset the larger divergence of the higher-order modes in each of the one or more second taper portions 205 and to minimize numbers of the higher-order modes to launch in the third portion 130 and to leak from the third interface 124, thus reducing energy losses and a number of localized hot spots in the output section 132. The localized hot spots in the outer polymer coating 125 cause reliability problems and possible failures and further reduce power carrying capability of the optical fiber combiner 100. In other words, with the first taper portion 118 in place, the larger divergence of the higher-order modes generated in the one or more second taper portions 205 can be compensated with some of the higher-order modes originally not supported by the 0.46-NA guided in the length of double-clad fiber 110 without leaking out to the outer polymer coating 125.

Although depicted in FIG. 2, FIG. 3, and FIG. 4 as six multimode fibers, the one or more multimode fibers 201 may comprise any integer numbers of multimode fibers, regardless of what are mentioned in literatures as extremely difficult to make, increasing insertion loss, and decreasing pump coupling efficiency for configurations with four or more multimode fibers. In contrast to all the reported side-coupling structures, the first taper portion 118 is adopted with associated multiple processes in making the optical fiber combiner 100 according to the present disclosure. In experiments, six 200 µm-core/220 µm-cladding with 0.22-NA multimode fibers each with a pump power of 200 W are used with the length of double-clad fiber of 20 µm-core/400 µm-cladding with 0.46-NA to build the optical fiber combiner 100. Experimental results show that such a (6+1)×1 optical fiber combiner can achieve an output beam divergence improvement of 10% when measured at the output of the optical fiber combiner 100, a coupling efficiency of 98%, and a good beam quality for the combined optical energy with a high production yield while maintaining an insertion loss of 0.1 dB for the optical signal. Due to such an output beam divergence improvement, a thermal performance is improved by at least 60%, thus enhancing reliability and power carrying capability of the (6+1)×1 optical fiber combiner 100. Although the (6+1)×1 optical fiber combiner 100 is used in above experiment, the one or more multimode fibers may comprise eight or more multimode fibers, limited by a jig that mechanically supports the one or more multimode fibers during production processes.

Whereas preferred embodiments of the present disclosure have been shown and described, it will be realized that alterations, modifications, and improvements may be made thereto without departing from the scope of the following claims. Another optical fiber combiner using various kinds of combinations of compensation tapers to accomplish the same or different objectives could be easily adapted for use from the present disclosure. Accordingly, the foregoing descriptions and attached drawings are by way of example only, and are not intended to be limiting.

What is claimed is:

1. An optical fiber combiner, comprising:
   a length of double-clad fiber comprising a first core, a first cladding with a first diameter, and a second cladding over the first cladding, the length of double-clad fiber configured to transmit an optical signal in the first core with the optical signal bounded in a first interface between the first core and the first cladding and propagating in a forward direction from an input to an output of the length of double-clad fiber, wherein:
      the length of double-clad fiber further comprises a cladding-stripped portion with the second cladding stripped,
      the cladding-stripped portion comprises a first portion in proximity to the input, a first taper portion, and a transition portion coupling between the first portion and the first taper portion, and
      the first taper portion comprises cross sections with diameters thereof progressively reduced from the first diameter to a predetermined diameter in a backward direction with respect to propagation of the optical signal; and
   one or more multimode fibers each respectively comprising a second core, a third cladding, outer claddings and buffer coatings over the third cladding, and a section of multimode fiber with the outer claddings and buffer coatings stripped, wherein a part of the section of multimode fiber is configured to be heated and stretched into a second taper portion with a first predetermined taper slope with respect to an optical axis of the section of multimode fiber,
   wherein:
      the second taper portion is configured to be fused around the transition portion;
      the one or more multimode fibers are configured to carry a combined optical energy and to couple the combined optical energy to the length of double-clad fiber, continuing to be guided in the first cladding and bounded in a second interface between the first cladding and the air in the first taper portion;
      the combined optical energy passes through the second taper portion with an increasing divergence angle against an optical axis of the second taper portion for each internal reflection, thereby generating higher-order modes and leading to a larger divergence; and
      the first taper portion is configured to reduce the larger divergence of the higher-order modes to a smaller divergence, thereby preserving some of the higher-order modes bounded in the length of double-clad fiber and increasing a coupling efficiency of the combined optical energy coupled from the one or more multimode fibers to the length of double-clad fiber.

2. The optical fiber combiner of claim 1, wherein the length of double-clad fiber further comprises a third portion comprising an output section, wherein the output section comprises an outer polymer coating over the second cladding, wherein the third portion is configured to couple the output section to the first taper portion and to output both the optical signal and the combined optical energy coupled, and wherein the combined optical energy coupled is guided in the first cladding and bounded by a third interface between the first cladding and the second cladding in the output section.

3. The optical fiber combiner of claim 2, wherein the first taper portion comprises a second predetermined taper slope with an opposite sign to the first predetermined taper slope, the second predetermined taper slope configured to partially offset the larger divergence of the higher-order modes in the second taper portion and to minimize a number of the higher-order modes to launch in the third portion and to leak from the third interface, thereby reducing an energy loss and a number of localized hot spots in the outer polymer coating rendering burning damages, and thereby further increasing power carrying capability and reliability of the optical fiber combiner.

4. The optical fiber combiner of claim 2, wherein the transition portion comprises a power transfer region configured to allow the combined optical energy to transfer power from the one or more multimode fibers to the length of double-clad fiber, wherein the first taper portion progressively reduces a diameter thereof toward the predetermined diameter to form a waist in proximity to the power transfer region, wherein the second taper portion progressively reduces a diameter thereof toward one end to form a second taper end, and wherein the waist and overall one or more second taper ends in the one or more multimode fibers are fused together to form a waist portion in the power transfer region with a cross-sectional diameter smaller than the first diameter.

5. The optical fiber combiner of claim 4, wherein the one or more multimode fibers comprise eight multimode fibers.

* * * * *